Patented May 29, 1934

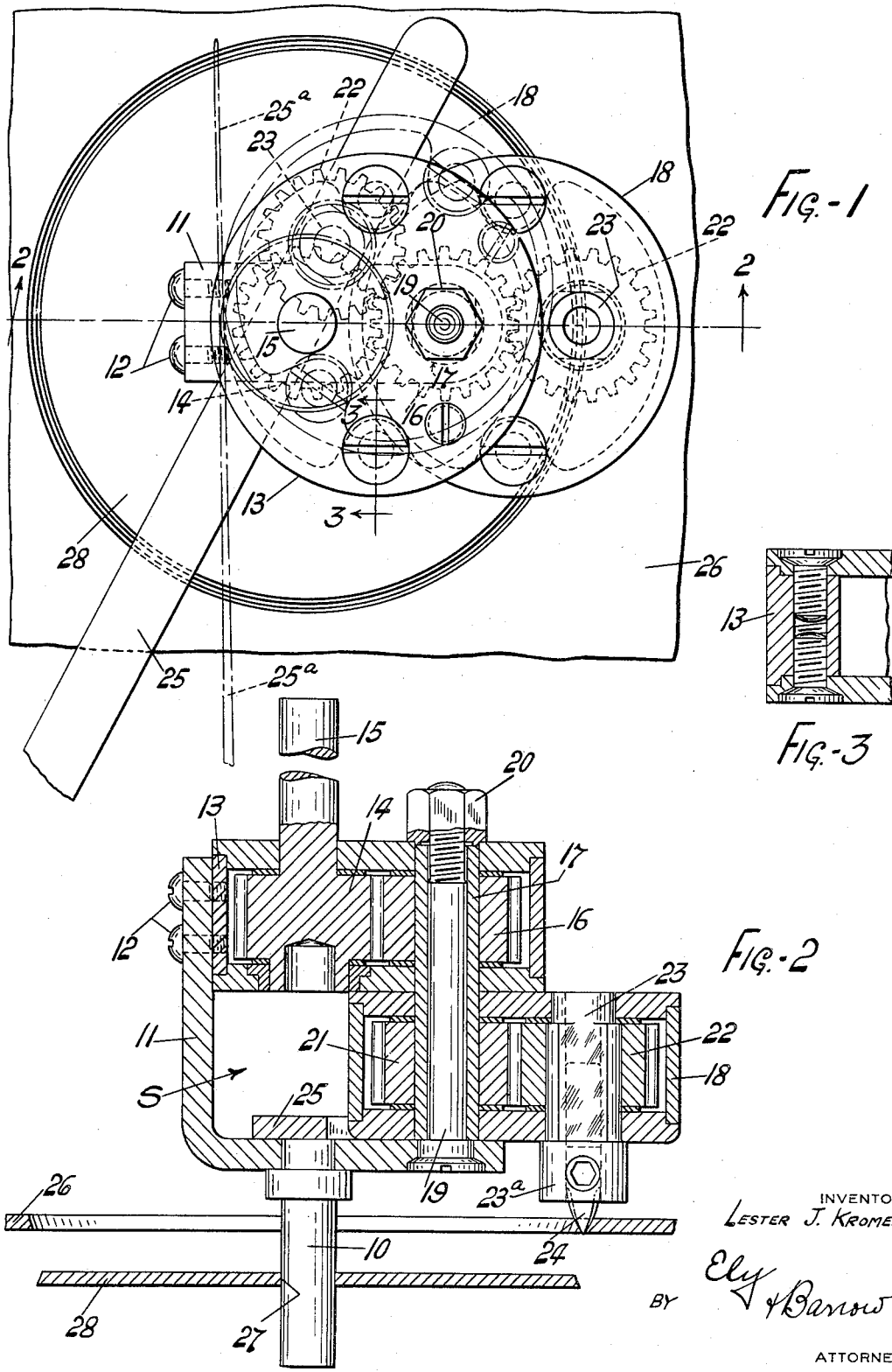

1,960,676

UNITED STATES PATENT OFFICE 1,960,676

CUTTING TOOL

Lester J. Kromer, Akron, Ohio

Application May 19, 1933, Serial No. 671,853

6 Claims. (Cl. 164—32)

This invention relates to cutting tools and particularly to tools for cutting holes in metal panels or the like, as, for example, in the instrument panels of vehicles.

The general purpose of the invention is to provide a tool for the purpose described including a center and a power-driven cutter readily adjustable with respect to said center and adapted to be power-driven in all of its various adjusted positions to cut holes of various diameters.

The foregoing and other purposes of the invention are attained in the device illustrated in the accompanying drawing and described below. It is to be understood that the invention is not limited to the particular form thereof shown and described.

Of the accompanying drawing,

Figure 1 is a plan view of a device embodying the invention;

Figure 2 is a section on line 2—2 of Figure 1; and

Figure 3 is a section on line 3—3 of Figure 1.

Referring to the drawing, the numeral 10 designates a center to which may be secured an L-shaped bracket 11 having secured thereto as by screws 12, 12, a gear housing 13 in which is journaled a drive gear 14, the latter preferably being axially aligned with center 10. Gear 14 may be driven through a shaft 15 connected thereto and extending out of the housing 13 and which may be connected to a power-driven element such as the chuck of a portable electric drill or other similar power-driven chuck.

Gear 14 is meshed in housing 13 with a gear 16 which is secured to a hollow shaft 17. Shaft 17 extends through housing 13 and eccentrically through an adjustable housing 18 and is journaled in these housings on a bolt 19 which extends through bracket 11, through the hollow shaft 17 in housings 18 and 13 and is adapted to be tightened as by a nut 20 to secure housings 13 and 18 rigidly together in any desired adjusted position. As will be apparent when the bolt 19 is loosened housing 18 may be eccentrically rotated to different radial positions with respect to the center 10.

In housing 18 there is secured on the hollow shaft 17, a gear 21 which is meshed with a gear 22 on a tool shaft 23 journaled in the housing 18. The tool shaft 23 may be provided with a tool chuck 23ª exteriorly of housing 18 on the under side thereof and in which may be secured a rotary cutting tool 24.

The space at S defined by the bracket 11, the casing 13 and the casing 18, which will vary in width with the adjustment of casing 18, is adapted to receive a tool-revolving bar 25 therein to be used to cause the rotary cutter 24 to revolve about the center 10 in the cutting of a hole. With a small space a thin bar such as a screwdriver may be inserted therein as indicated at 25ª in dotted lines in Figure 1.

In Figure 1, casing 18 is shown in full lines adjusted to cause the tool to cut a hole of the maximum diameter of which the tool is capable, and in dotted lines casing 18 is shown adjusted for cutting a hole of minimum diameter.

In operation, a panel 26 has a small hole 27 bored therethrough at the located center of a larger hole to be made in the panel. The tool, mounted in a portable power driven chuck (not shown), has its center 10 engaged in hole 27 and the tool is pressed against the panel to cause cutter 24 to cut through the panel. When this is done, then a bar such as bar 25 is inserted in space S and is used to cause the cutter 24 to revolve about center 10, the pressure on bar 25 being gauged to cause the tool to cut circumferentially about the center 10 until the disc 28 of metal is cut out of the panel. Figure 2 illustrates the disc cut from the panel and dropping out of the aperture therein at the end of the cutting operation.

It is obvious that the tool is capable for use in making discs as well as for cutting holes in panels or the like. It is also obvious that the tool is useful for cutting arcuate or circular grooves or slots in a panel and for making oval or elliptical grooves, slots or holes by making arcuate cuts from different centers. The tool is also capable of cutting an edge of any desired radius about an aperture already formed. For example, a clamp having an aperture therein may be secured to the edge of a panel in an opening of the panel with the aperture in the clamp located in said opening to locate the center of the tool in said opening.

Modifications of the invention may be resorted to without departing from the spirit thereof or the scope of the appended claims. Obviously grinding, milling, rasping and other tool elements might be substituted for the cutter 24, and the expressions "cutting tool" and "cutting element" as employed in the claims is intended to cover various metal or wood working tools and elements.

What is claimed is:

1. A cutting tool comprising a center, a rotary cutting element adjustable to different radial distances from said center, means for securing said rotary cutting element at different radial distances from said center, and means coaxial with said center for driving said cutting element in all positions of radial adjustment thereof while said tool is being revolved about said center.

2. A cutting tool comprising a center, a rotary cutting element adjustable to different radial distances from said center, means for securing said rotary cutting element at different radial distances from said center, and means for driving said cutting element in all positions of radial adjustment thereof while said tool is being revolved about said center, said cutting element being journaled on a support mounted for movement about an axis that is eccentric with respect to said center.

3. A cutting tool comprising a center, a rotary cutting element adjustable to different radial distances from said center, means for securing said rotary cutting element at different radial distances from said center, and means for driving said cutting element in all positions of radial adjustment thereof while said tool is being revolved about said center, said cutting element being journaled on a support and having a gear thereon meshed with a second gear on said support and mounted in a radially fixed position eccentrically respecting said center, said element being angularly adjustable about the center of said second gear, and means for driving said second gear independently of the movement of the tool about the center.

4. A cutting tool comprising a center, a rotary cutting element adjustable to different radial distances from said center, means for securing said rotary cutting element at different radial distances from said center, and means for driving said cutting element in all positions of radial adjustment thereof while said tool is being revolved about said center, said cutting element being journaled on a support and having a gear thereon meshed with a second gear on said support and mounted in a radially fixed position eccentrically respecting said center, said element being angularly adjustable about the center of said second gear, and means for driving said second gear, said second gear being secured on a shaft mounted in a fixed, eccentric position radially of said center and having a third gear thereon which is meshed with a fourth gear secured upon a drive shaft that is journaled in axial alignment with said center.

5. A cutting tool for the purposes described, comprising a center, an L-shaped bracket mounted thereon, one arm of the L being secured to the center, a casing fixedly secured to the end portion of the other arm of the L in spaced relation to the first-named arm of the L, a drive shaft extended into said casing, a gear on said casing on said drive shaft, a rotatable shaft in said casing eccentrically of the drive shaft and having a second gear thereon meshed with the first gear, a second casing mounted on the first-named arm of the L between it and the first casing, said rotatable shaft extending into said second casing, said second casing being eccentrically rotatable to different angular positions about said rotatable shaft, means for securing said second casing in an adjusted angular position respecting said rotatable shaft, a third gear on said rotatable shaft in said second casing, a fourth gear in said second casing meshed with the third gear, and a cutting element extending below the second casing and connected with said fourth gear to be rotated thereby, the space defined by said L-shaped bracket and said first and second casings being adapted to receive a bar for revolving the tool about said center while said cutting element is rotated through said gears.

6. A cutting tool for the purposes described, comprising a center, an L-shaped bracket mounted thereon, one arm of the L being secured to the center, a casing fixedly secured to the end portion of the other arm of the L in spaced relation to the first-named arm of the L, a drive shaft extended into said casing, a gear on said casing on said drive shaft, a rotatable shaft in said casing eccentrically of the drive shaft and having a second gear thereon meshed with the first gear, a second casing mounted on the first-named arm of the L between it and the first casing, said rotatable shaft extending into said second casing, said second casing being eccentrically rotatable to different angular positions about said rotatable shaft, means for securing said second casing in an adjusted angular position respecting said rotatable shaft, a third gear on said rotatable shaft in said second casing, a fourth gear in said second casing meshed with the third gear, and a cutting element extending below the second casing and connected with said fourth gear to be rotated thereby.

LESTER J. KROMER.